Figure 1:
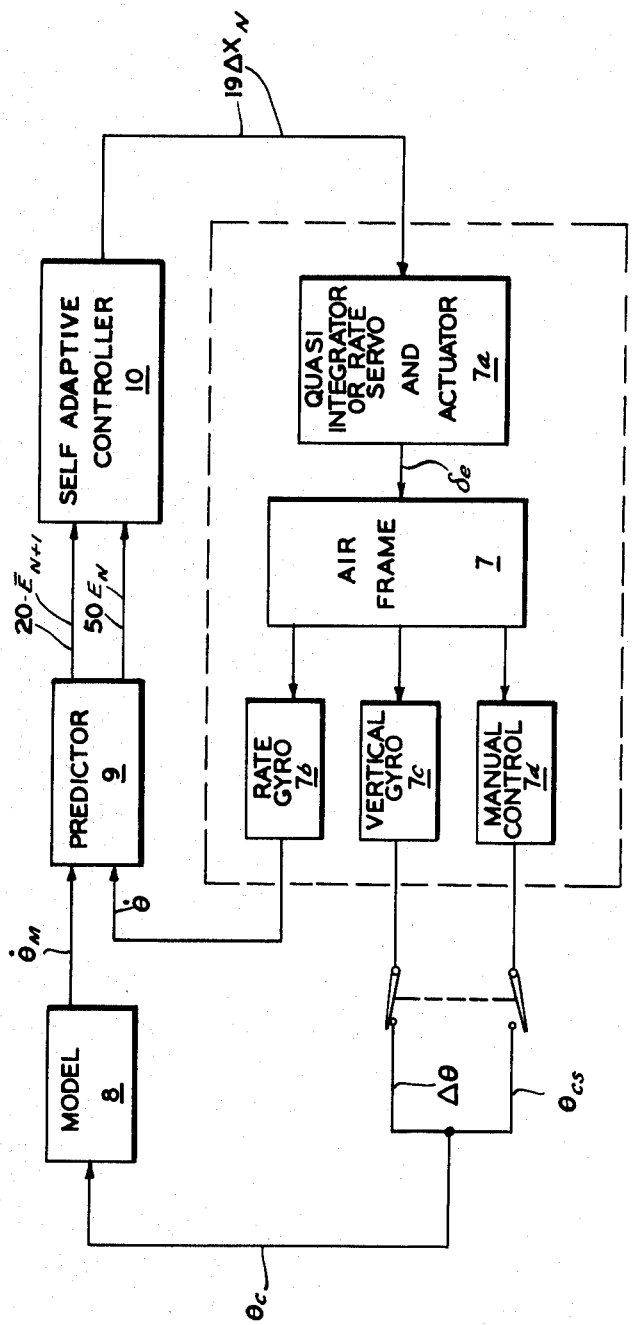

INVENTORS
ARNOLD UNGER
GEORGE H. PFERSCH JR.
BY Charles J. Worth
AGENT

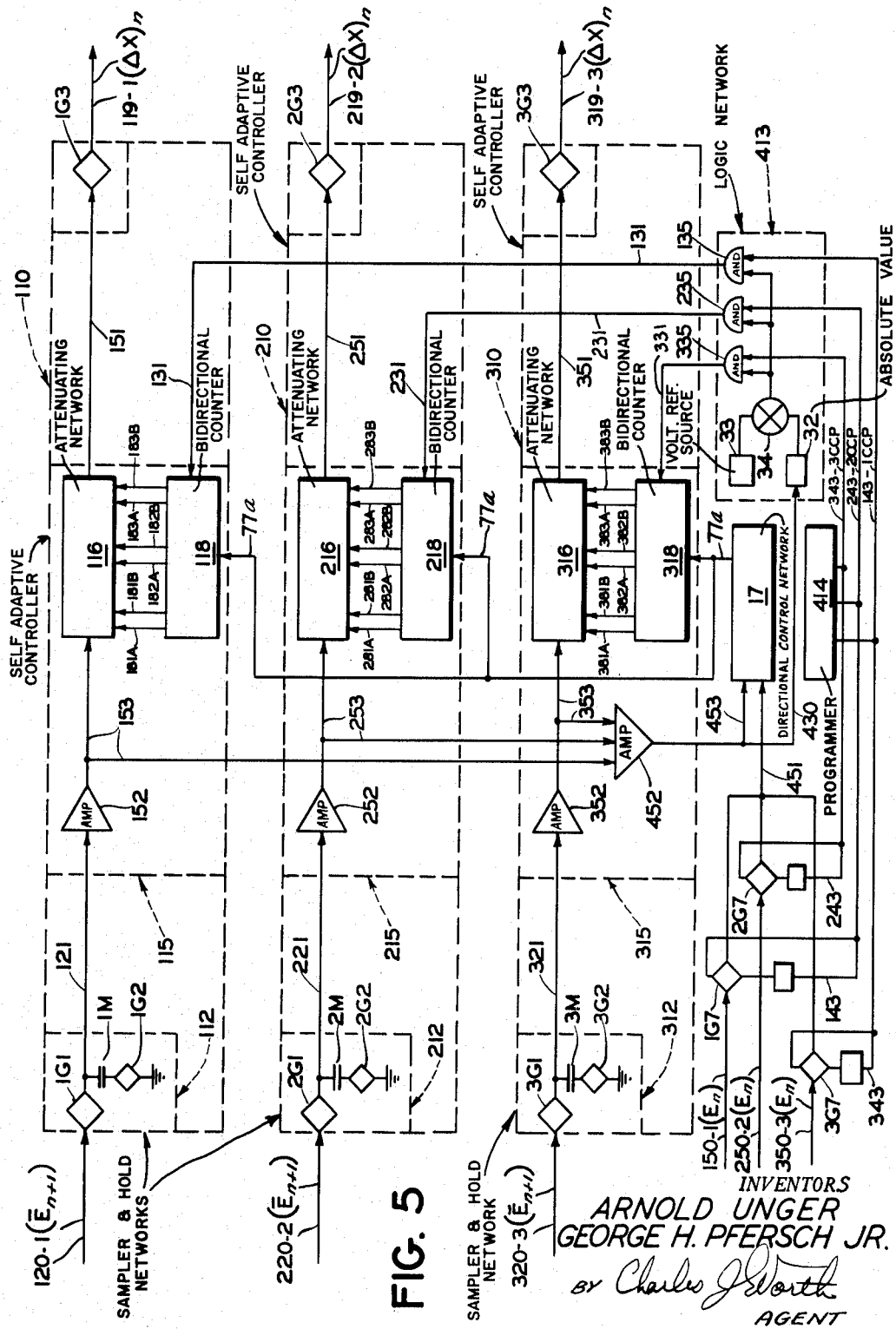

3,221,238
**SELF-ADAPTIVE INCREMENTAL GAIN
ADJUSTED CONTROL SYSTEM**
Arnold Unger, Totowa, and George H. Pfersch, Jr., West
 Orange, N.J., assignors to The Bendix Corporation,
 Teterboro, N.J., a corporation of Delaware
Filed Jan. 6, 1961, Ser. No. 81,084
10 Claims. (Cl. 318—489)

This invention relates generally to control systems for vehicles capable of flight and to self-adaptive controllers for such systems that use sampled data to provide signals to the controls of airborne vehicles.

A self-adaptive control system is particularly adaptable to vehicles which operate both in the earth's atmosphere and outer space, and encounter conditions of extremely high and negligibly small aerodynamic and accelerating forces. The usual control system design criteria applicable to vehicles capable of flight within the earth's atmosphere as well as additional problems peculiar to space vehicles must be considered. Space vehicles encounter a wide range of flight conditions which make it difficult to measure and predict aerodynamic parameters. In addition, they may exhibit a lack of static attitude stability when in nonatmospheric flight. Highly accurate and sensitive controls are required by such craft flying at extreme speeds and distances, and precision is necessary for breaking through the limits of the earth's atmosphere. The system must be capable of manual control under high and low "g" conditions. By applying self-adaptive techniques, the need for air data gain programming, and for accurate information relating to vehicle dynamic characteristics is obviated. The use of self-adaptive methods of flight control provides techniques for obtaining relatively constant transient response throughout a wide range of flight conditions. Although this type of a control system is adapted to control on all axes of the vehicle, only one chanel is shown and described in detail but not applied to a specific control direction. It should suffice to say that each control axis of the vehicle requires a channel to provide the specific associated directional control and may utilize components common to more than one channel where possible. This is exemplified by a plurality of self-adaptive controllers that are shown and described as using multiplexing or time sharing of components common to all of the controllers.

An object of this invention is to provide a self-adaptive control system for a vehicle capable of flight within and without the earth's atmosphere under an extremely wide range of flight conditions.

Another object of this invention is to provide a self-adaptive control system having a controller that uses sampled data to derive command increment signals which are applied to an associated control actuator.

Another object of this invention is to provide a self-adaptive control system having a plurality of controllers of the kind described that use multiplexing or time sharing of common components.

Another object of this invention is to provide a control system having a self-adaptive controller comprising a digital type programmer to control a timed, operating-sequence, digital type computer for periodically and incrementally adjusting the vehicle response, and a logic network to validate sampled data for computer operation.

Another object of this invention is to provide a control system having a plurality of self-adaptive controllers each having a computer for incrementally adjusting system gain of an associated control channel, means common to all the computers to provide information for adjusting the system gain of each controller according to associated sampled data, and means for sequentially programming each controller to provide an operating sequence for the system.

This invention contemplates a self-adaptive control system using sampled data at discrete intervals to provide command increment signals to control a device with means for providing signals representing actual response and rate of response of the device to the command increment signals, comprising means connected to the device for providing a signal representing desired response according to the actual response signal, means connected to the device and to the desired response signal providing means for providing signals representing actual present error and predicted error at a predetermined future instant and according to the desired response and rate of response signals, and programmed controller means connected to the error signal providing means for providing the command increment signals by modifying the predicted error signal by system gain and by transmitting the gain modified signal at discrete intervals, the controller means having means for sampling and storing the predicted error signal and for incrementally adjusting system gain at discrete intervals according to the relative errors represented by the actual and stored error signals.

The foregoing and other objects and advantages of the invention will appear more fully hereinafter from a consideration of the detailed description which follows, taken together with the accompanying drawings, wherein several embodiments of the invention are illustrated by way of example. It is to be expressly understood, however, that the drawings are for illustration purposes only and are not to be construed as defining the limits of the invention.

Figure 2:
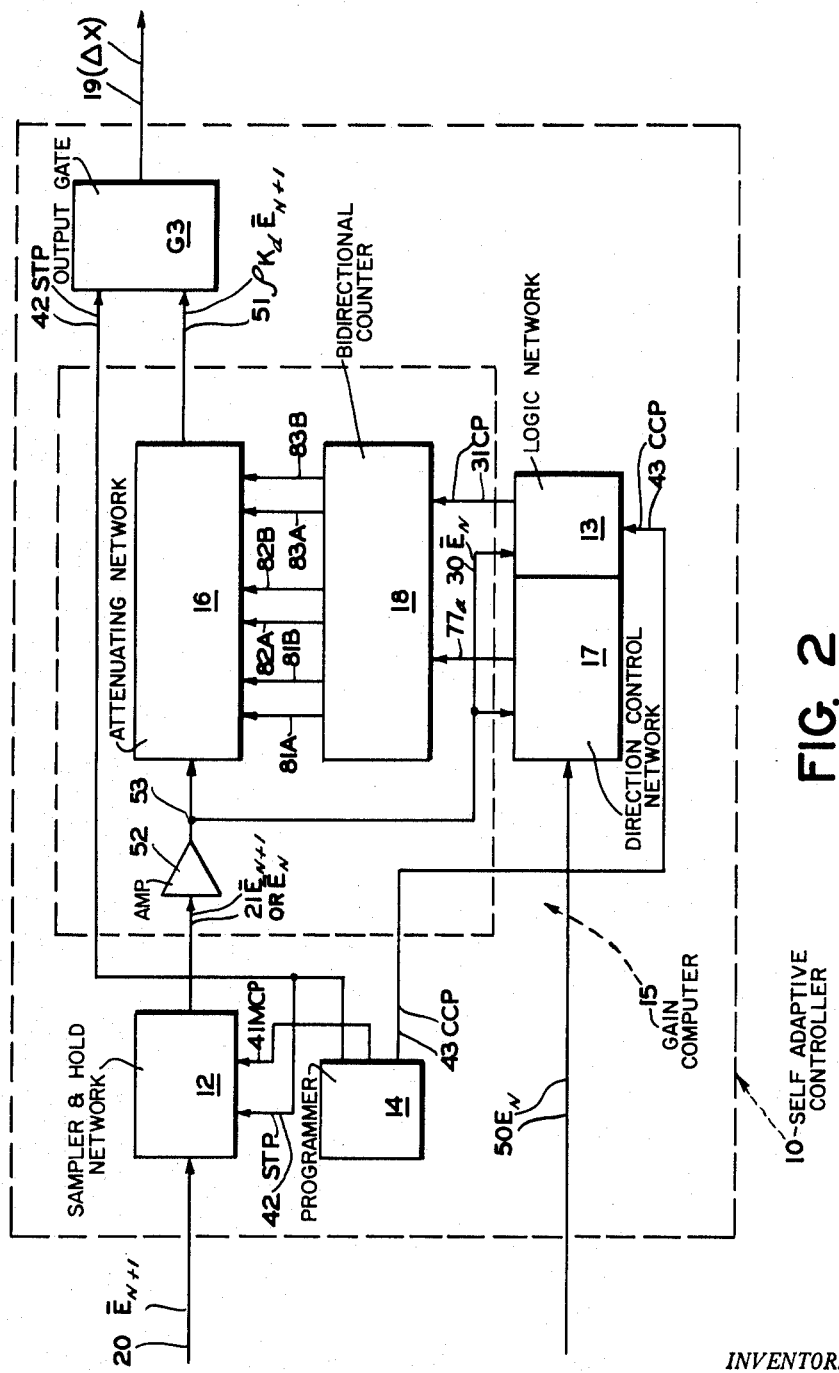
Figure 3:
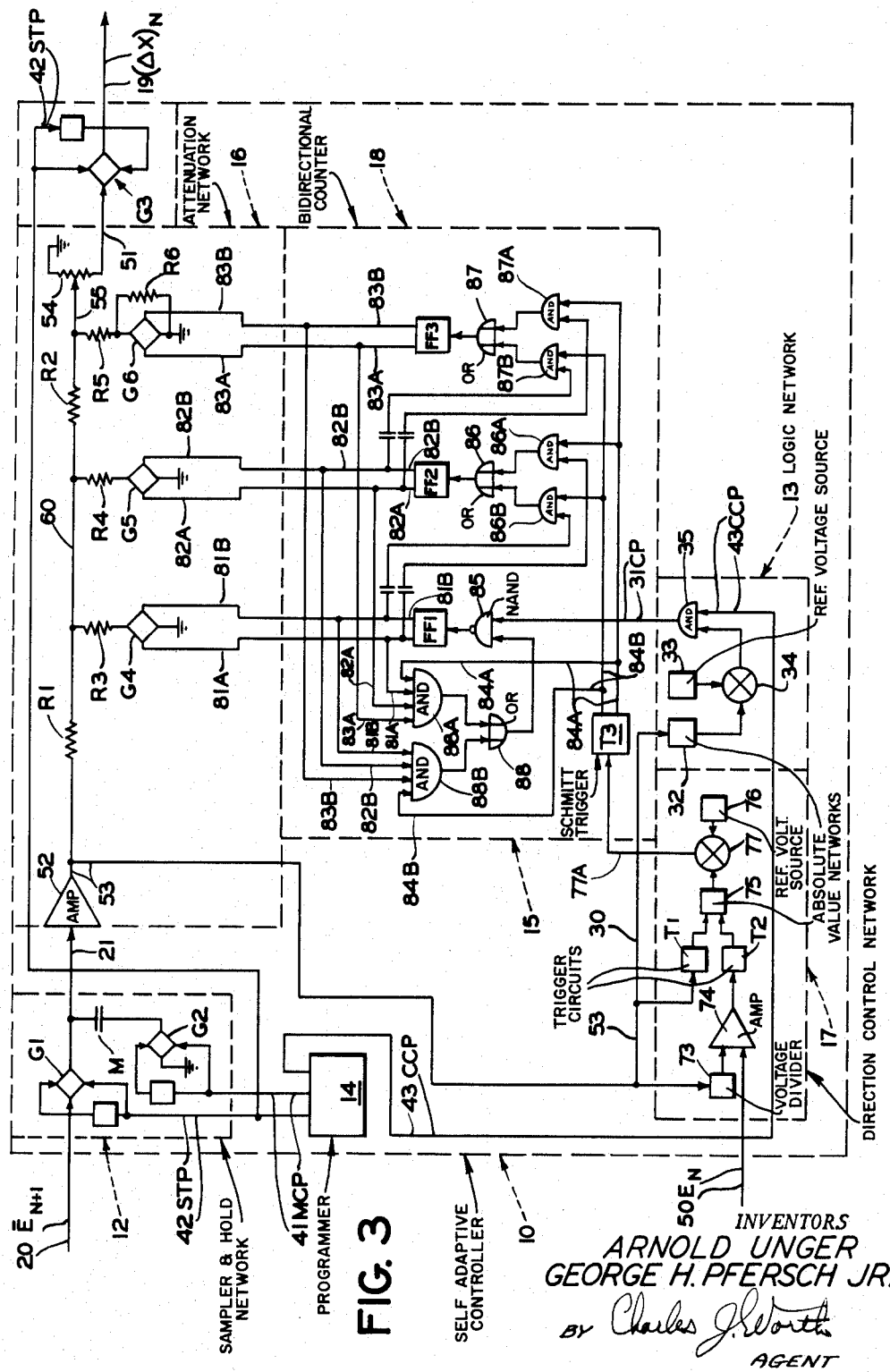
Figure 4:
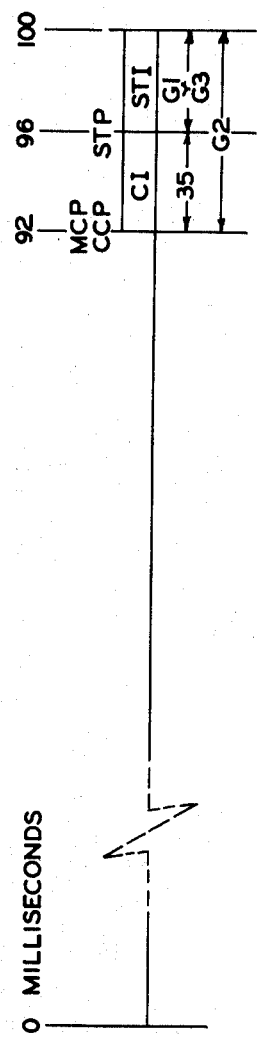
Figure 6:
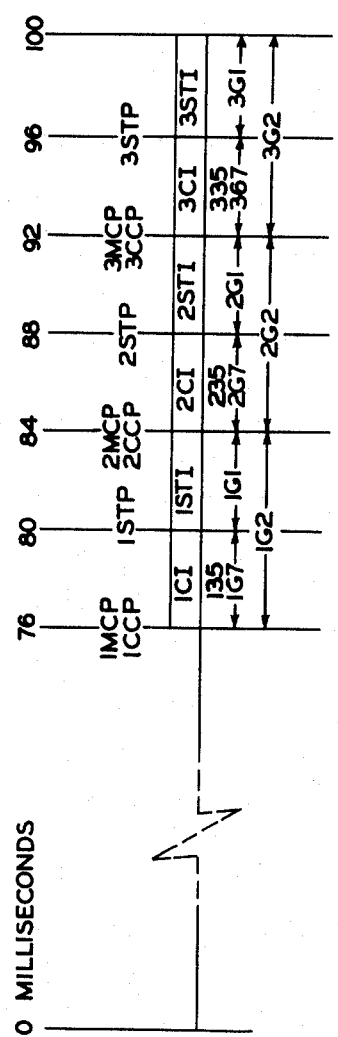

FIGURE 1 is a block diagram of a novel self-adaptive control system including a controller constructed according to the invention, FIGURES 2 and 3 are block and circuit diagrams, respectively, of the novel controller of FIGURE 1, FIGURE 4 is a chart showing the programmed sequence of the self-adaptive controller of FIGURES 1, 2 and 3, FIGURE 5 is a block diagram of three self-adaptive controllers, of the kind shown in FIGURES 2 and 3, that use multiplexing or that time share components common to all the controllers, and, FIGURE 6 is a sequencing chart showing the programmed sequence of the controllers of FIGURE 5.

The basic concepts of sampled data, self-adaptive control systems and the mathematical derivation of the various parameters relating thereto have been extensively discussed in U.S. patent application Serial No. 56,033 of W. A. Platt, A. Unger, J. G. McGough and G. H. Pfersch, Jr., filed September 14, 1960 and assigned to the same assignee as the present application. Accordingly, the invention of this application is an improvement over that of the earlier application.

Referring now to the drawings, the novel self-adaptive control system shown in FIGURE 1 comprises a model system 8, a predictor 9 and a self-adaptive controller 10. Signal $\overline{E}_{n+1}$ representing the predicted error at the next time instant hereinafter called the predicted future error signal, and signal $E_n$ representing the actual error at the present time instant hereinafter called the actual present error signal are continuously provided by predictor 9 and applied by lines 20 and 50, respectively, to the self-adaptive controller 10. The controller 10 modifies the predicted future error signal $\overline{E}_{n+1}$ by computed system gain $K_d$ and a constant $\rho$ to derive command increments or incremental output steps $(\Delta X)_n$ that are applied by an output line 19 to a rate servo or a quasi-integrator and control actuator 7a at discrete intervals. The object of the controller 10 is to command a control surface deflection $\delta e$ by the sum $(\Sigma \Delta X)_n$ of the command increment $(\Delta X)_n$, so the difference or the actual error between the actual and desired responses is reduced. The system functions to provide system response depending primarily on the characteristics of the model 8 and the input command $\theta_c$, and not on the dynamic characteristics of the air frame 7.

The controller 10 has a repetitive operating sequence and uses the actual and predicted present error signals $E_n$ and $\overline{E}_n$ to derive a compute pulse CP and a direction control signal for incrementally increasing or decreasing system gain $K_d$ as determined during each sequence. The controller modifies a predicted future error signal $\overline{E}_{n+1}$ by gain $K_d$ and a constant $\rho$ to provide the command increment $(\Delta X)_n$ that is summed with past incremental input steps and the total command $(\Sigma \Delta X)_n$ equals the total deflection command signal $\delta ec$ of the vehicle controls (not shown). The air frame 7 responds to the total deflection command signal $\delta ec$, and includes a rate gyro 7b to provide an indicated rate of change of attitude signal $\dot{\theta}$ and a vertical gyro 7c to provide an indicated attitude displacement signal $\Delta \theta$ representing the actual response of the device. A manual control 7d may provide a signal $\theta_{cs}$. A command signal $\theta_c$ is derived from signal $\Delta \theta$ or $\theta_{cs}$, or other signal or signals (nor shown) and is applied to the model 8.

One criterion governing the novel system is to provide a desired vehicle response, such as a desired natural frequency and a specific damping factor. This is specified by the model 8 which derives a desired response signal $\theta_m$ from the commanded signal $\theta_c$. By comparing the desired response signal $\theta_m$ from the model with the rate of change of attitude signal $\dot{\theta}$ from the rate gyro at a time instant $t_n$, being the present, the actual present error signal $E_n$ is derived. In addition to the actual present error signal $E_n$, the controller 10 requires the predicted future error signal $\overline{E}_{n+1}$, representing a prediction at the present time $t_n$ of the error to exist at the next sampling instant $t_{n+1}$ if no further command increment $(\Delta X)_n$ is applied after the prediction is made. The predictor 9 derives the predicted future error signal $\overline{E}_{n+1}$ by approximating the Taylor expansion by $\overline{E}_{n+1} = E_n + t\dot{E}_n$.

The operating sequence of controller 10 (FIG. 4) is of approximately 100 milliseconds duration and is divided into three intervals. The first or quiescent interval is from 0 to 92 milliseconds. The second or compute interval CI is from 92 to 96 milliseconds, during which time system gain $K_d$ is adjusted. The third or sample and transfer interval STI is from 96 to 100 milliseconds during which time the predicted future error signal $\overline{E}_{n+1}$ is sampled, and the command increment $(\Delta X)_n$ is provided by controller 10. The sample and transfer interval STI must be held as closely invariant as possible from one sequence to the other because the quasi-integrator or rate servo is responsive to the transfer time of the command increment $(\Delta X)_n$ as well as to its value.

The self-adaptive controller 10, shown in FIGURE 2, comprises a gated sampler-and-hold network 12, a logic network 13, a programmer 14, a gain computer 15, a direction control network 17, and an output gate G3. The sampler-and-hold network 12 has an input line 20 for receiving the predicted future error signal $\overline{E}_{n+1}$ continuously provided by predictor 9. The sampler-and-hold network 12 also has an output line 21 connected to the gain computer 15 to provide the predicted future error signal $\overline{E}_{n+1}$ thereto during the sample and transfer interval STI, and to provide a stored predicted present error $\overline{E}_n$ thereto during the compute interval CI. The stored error signal $\overline{E}_n$ is the predicted future error signal $\overline{E}_{n+1}$ that was sampled during the previous operating sequence. The input line 50 of self adaptive controller 10 receives the actual present error signal $E_n$, also continuously provided by the predictor 9.

During the compute interval CI, the sampler-and-hold network 12 transmits the memorized or stored predicted present error signal $\overline{E}_n$ by line 21 to the computer 15. A line 30 applies signal $\overline{E}_n$ to logic network 13 from computer 15 to derive a compute pulse CP. Direction control network 17 uses the predicted and actual present error signals $\overline{E}_n$ and $E_n$ to derive a directional control signal, according to a signal sign relationship, that is applied to computer 15 for adjusting system gain $K_d$. The logic network 13 applies the compute pulse CP to the gain computer 15 by line 31, if a criterion $|\overline{E}_n| > \overline{E}_{min}$ is satisfied, in response to a compute control pulse CCP from programmer 14. The compute pulse CP incrementally adjusts system gain up or down as determined by the direction control signal.

During the sample and transfer interval STI, a memory device M (FIGURE 3) samples the predicted future error signal $\overline{E}_{n+1}$ transmitted by predictor 9 and the sample predicted error signal is then applied by line 21 to the computer 16 where it is modified by system gain $K_d$, and by the constant $\rho$ that represents the portion of the predicted error to be corrected for. The resulting signal $\rho K_d \overline{E}_{n+1}$ is applied to gate G3 by an output line 51. Gate G3 being open in response to a sample and transfer pulse STI from programmer 14, transmits signal $\rho K_d \overline{E}_{n+1}$ to output line 19 as a command increment $(\Delta X)_n$.

As shown in FIGURE 3, the sampler-and-hold circuit 12 has a diode gate G1 connecting the input line 20 to the output line 21. A memory device M is connected to line 21, and is connected to ground by a diode gate G2. While the memory device M is shown as a capacitor in the preferred embodiment, equivalent devices can be substituted as long as they are capable of receiving and storing information. All the diode gates of the self-adaptive controller 10, identified by the letter G and by a number, can be diode gates as shown and described in U.S. patent application Serial No. 25,376, of E. Hartog and H. Moreines, filed April 28, 1960 and assigned to the same assignee as the present application.

The logic network 13 of controller 10 implements a criterion that must be satisfied by the stored predicted error signal $\overline{E}_n$ before a compute pulse CP is applied to computer 15. This criterion is satisfied if the absolute value of the stored or predicted present error signal $|\overline{E}_n|$ exceeds a minimum value $\overline{E}_{min}$. To accomplish this and to provide a compute pulse CP, logic network 13 has an absolute value network 32 that receives the predicted present error signal $\overline{E}_n$ from the sample and hold network 12 during the compute interval CI and applies a corresponding absolute value signal $|\overline{E}_n|$ to a summing means 34. A voltage source 33 provides the minimum value reference signal $\overline{E}_{min}$ to the summing means 34, in opposition to the absolute value signal $|\overline{E}_n|$, to provide a signal $|\overline{E}_n| - \overline{E}_{min}$. If the criterion $|\overline{E}_n| > \overline{E}_{min}$ is satisfied, the resulting difference or validated signal is applied to qualify an AND gate 35 to transmit a compute pulse CP, in response to a compute control pulse CCP from the programmer 14, that is applied to the computer 15 by an output line 31.

The gain computer 15 shown in FIGURE 3 comprises an amplifier 52, a resistance attenuating network 16 for modifying signals $\overline{E}_{n+1}$ by system gain $K_d$, a potentiometer 54 for modifying signal $K_d \overline{E}_{n+1}$ by the constant $\rho$, and a bidirectional counter 18 for controlling the attenuating network 16 to incrementally adjust system gain $K_d$ according to signals from the directional control network 17 and in response to compute pulses CP from the logic network 13.

The counter 18 has flip flop circuits for controlling network 16 which are limited in number. This limitation is merely to facilitate description of the device. The network 16 and the counter 18 can be enlarged or reduced according to the demands of the system with which they mesh.

Amplifier 52 is connected to line 21 from the sampler-and-hold circuit 12 for receiving predicted error signals $\overline{E}_n$ and $\overline{E}_{n+1}$, and has an output line 53 connected to the input line 30 of the logic network 13, to the directional control network 17 and to one end of a signal transmitting line 60 of the resistance attenuating network 16. The potentiometer 54 has a wiper 55 connected to the other end of line 60, and to an output line 51 connected to the input of the diode gate G3. Potentiometer 54 is set to modify the signal $K_d\overline{E}_{n+1}$ passing through network 16 by $\rho$ which is the fraction of the gain modified predicted future error signal $K_d\overline{E}_{n+1}$ that is to provide system control. Thus, the command increment $(\Delta X)_n$ corrects for only a part of the predicted error $\overline{E}_{n+1}$.

The attenuating network 16 is a variable voltage divider with two resistors R1 and R2 connected in series in the signal transmission line 60 that is connected at its terminals as previously described. Shunt resistor legs R3 and R4 are connected to line 60 between the resistors R1 and R2, and are connected to ground by diode gates G4 and G5, respectively. A shunt resistor leg R5 is connected to line 60 between resistor R2 and the line connection to potentiometer brush 51, and is connected to ground by a diode gate G6 and a resistor R6 connected in parallel with gate G6. As can be readily seen, the signal $E_{n+1}$ transmitted by line 60 from the amplifier 52 to the potentiometer 54 is attenuated according to system gain $K_d$ having an instantaneous value determined by resistance legs R3, R4 and/or R5 connected to ground across low impedance paths or transmitting gates G4, G5 and/or G6, respectively. The transmitting or nontransmitting states of the gates G4, G5 and G6 are controlled by the bidirectional counter 18.

The bidirectional counter 18 is comprised of three cascaded flip flops FF1, FF2, and FF3 each having two output lines 81A and 81B, 82A and 82B, 83A and 83B, respectively. All of the flip flops of counter 18 are transistorized bistable multivibrators and are generally well-known in the art. Typical flip flops are shown and described in chapter 5, pages 140 to 173 of the book "Pulse and Digital Circuits," written by J. Millman and H. Taub, and published in 1956 by McGraw-Hill Book Company, Inc., of New York, New York.

Flip flop FF1 has an AND gate 85 connected to its input for controlling transmission of compute pulses CP provided thereto. Flip flops FF2 and FF3 have pairs of AND gates 86A and 86B, and 87A and 87B, respectively, connected to their respective inputs by OR gates 86 and 87, respectively, to control transmission of compute pulses provided to the respective gates.

Output lines 81A and 81B of flip flop FF1 are connected to diode gate G4; are connected to AND gates 88A and 88B, respectively; and are connected by capacitors to AND gates 86A and 86B, respectively. Output lines 82A and 82B of flip flop FF2 are connected to diode gate G5, are connected to AND gates 88A and 88B, respectively; and are connected by capacitors to AND gates 87A and 87B, respectively. Output lines 83A and 83B of flip flop FF3 are connected to diode gate G6, and are connected to AND gates 88A and 88B, respectively.

When flip flop FF1 goes to a 0 state its output line 81A goes low, its output line 81B goes high providing a compute pulse CP to AND gate 86B and a voltage to AND gate 88B, and the high-low states of lines 81A and 81B bias diode gate G4 to block transmission from resistor leg R3 to ground. Conversely, when flip flop FF1 goes to a 1 state, the high-low states of output lines 81A and 81B reverse and provide a compute pulse to AND gate 86A, a voltage to AND gate 88A and bias diode gate G4 to transmit.

When flip flop FF2 goes to a 0 state its output line 82A goes low, its output line 82B goes high providing a compute pulse CP to AND gate 87B and a voltage to AND gate 88B, and the high-low states of lines 82A and 82B bias diode gate G5 to block transmission from resistor leg R4 to ground. Conversely, when flip flop FF2 goes to a 1 state the high-low states of output lines 82A and 82B reverse and provide a compute pulse to AND gate 87A, a voltage to AND gate 88A and bias diode gate G5 to transmit.

When flip flop FF3 goes to a 0 state its output line 83A goes low, its output line 83B goes high providing a voltage to AND gate 88B, and the high-low states of lines 83A bias diode gate G6 to block transmission from resistor leg R5 to ground. Conversely, when flip flop FF3 goes to a 1 state the high-low states of its output lines 83A and 83B reverse and provide voltage to AND gate 88A and bias diode gate G6 to transmit.

Counter 18 is a bidirectional for count-up and count-down operation, the direction of which is controlled by the output signal provided by an output line 77a from the direction control network 17. The counter must also be limited to a maximum count-up count of "1 1 1" and to a mimimum count-down count of "0 0 0". The minimum and maximum counts of the counter 18 are also controlled according to the direction control signal provided by output line 77a. Line 77a is connected to a trigger ciruit T2, such as a Schmitt trigger, which provides either a count-up operation signal as its output line 84A or a count-down operation signal at its output line 84B. The trigger output line 84A is connected to AND gates 86A, 87A, and 88A, while output line 84B is connected to AND gates 86B, 87B, and 88B. When the direction control signal applied to trigger circuit T3 by line 77a is positive, a count-up signal is provided in line 84A that applies the qualifying signal to its associated AND gates. However, when the direction control signal applied to trigger circuit T3 is negative, a count-down signal is provided in line 84B that is applied to its associated gates.

Accordingly, when the direction control network 17 provides a signal for count-up operation, AND gates 86A and 87A are qualified to transmit compute pulses to flip flops FF2 and FF3, respectively, if the respective flip flops FF1 and FF2 go from 1 states to 0 states. However, gates 86B and 87B are not qualified and block compute pulses CP if flip flops FF1 and FF2, respectively, go from 0 states to 1 states. If the signal from network 17 is reversed for count-down operation, AND gates 86B and 87B are qualified to transmit compute pulses provided by flip flops FF1 and FF2 going from 0 states to 1 states to provide compute pulses CP to flip flops FF2 and FF3, respectively. However, gates 86A and 87A are not qualified and block compute pulses CP if flip flops FF1 and FF2 go from 1 states to 0 states.

Lines 81A, 82A, 83A, and 84A are all connected to AND gate 88A and provide a signal through an OR gate 88 to the NAND gate 85 when all of the lines provide a voltage. Similarly lines 81B, 82B, 83B, and 84B are connected to AND gate 88B which provides a signal through OR gate 88 to NAND gate 85 when all of the lines provide voltage. Thus, when all of the flip flops FF1, FF2, and FF3 are in 1 states and a count-up signal is provided, AND gate 88A transmits a signal to NAND gate 85 via OR gate 88 to block compute pulses applied to NAND gate 85 by line 31 to prevent flip flop FF1 from going to a 0 state and to reset counter 18. Similarly, AND gate 88B transmits a signal to NAND gate 85 via OR gate 88 when all of the flip flops FF1, FF2, and FF3 are in 0 states and a count-down signal is provided by network 17.

The programmer 14 is a pulse generator which may be of the character shown and described in copending U.S. patent application S.N. 806,625 of A. S. Robinson, filed April 15, 1959 and assigned to the same assignee as the present application. There are many and varied pulse generators which may be used as programmer 14 in place of the device of the copending application. It should suffice to say that the programmer 14 as shown in FIGURES 2 and 3 provides memory control pulses MCP to gate G2 by its line 41, sample and transfer pulses STP to gates G1 and G3 by its output line 42 and compute control pulses CCP to logic circuit 13 by its output line 43. The programmer 14, by providing and rescinding the various control pulses, controls the various intervals of the operating sequence of the self-adaptive controller 10.

Line 53 of counter 15 is connected to line 30, and to a voltage divider network 73 and a trigger circuit T1 in directional control network 17 to provide the predicted present error signal $\overline{E}_n$ during the compute interval CI. Voltage divider network 73 has a value C that represents the desired fraction of the predicted present error to be present as the actual present error. Input line 50 applies the actual present error signal $E_n$ to a differential amplifier 74 that simultaneously receives the modified predicted present error signal $C\overline{E}_n$ from network 73 and provides an output signal $E_n - C\overline{E}_n$ to a second trigger circuit T2. The two trigger circuits T1 and T2 each provide a fixed amplitude output signal having a polarity corresponding to the respective input signals. The two output signals of defined polarity from trigger circuits T1 and T2 are applied to an absolute value network 75 that provides a positive voltage at its output if the signals from the two trigger circuits T1 and T2 are both positive or both negative. However, absolute value network 75 provides no output signal if the output signal from one of the trigger circuits T1 or T2 is positive and the other signal is negative. The output of the absolute value network 75 is connected to a summing means 77 receiving a reference voltage $E_{ref}$ from a source 76. When the absolute value network 75 provides an output signal that is applied to summing means 77 opposing and exceeding the reference signal $E_{ref}$, a positive direction control signal is transmitted to trigger T3 by line 77A. However, a negative direction control signal is provided to trigger T3 when there is no output signal from network 75.

Considering the operation of the controller 10 during one operating sequence as charted in FIGURE 4, from 0 to 92 milliseconds programmer 14 provides no control pulses and the self-adaptive controller 10 remains in a quiescent state.

At 92 milliseconds programmer 14 provides a memory control pulse MCP that is applied to gate G2 and a compute control pulse CCP that is applied to AND gate 35 of logic network 13 by line 43. With gate G2 transmitting in response to pulse MCP, capacitor M provides the stored or predicted present error signal $\overline{E}_n$ to amplifier 52. The predicted present error signal $\overline{E}_n$ is the predicted future error signal $\overline{E}_{n+1}$ that was sampled and held during the previous sequence. The predicted present error signal $\overline{E}_n$ is applied by line 53 to the direction control network 17 for deriving a positive or a negative direction control signal in line 77a as previously described. Line 77a applies the signal to trigger circuit T3 that provides a qualifying signal to AND gates 86A, 87A, and 88A, or to AND gates 86B, 87B, and 88B depending upon the polarity of the signal provided by line 77a. Simultaneously, line 53 provides the predicted present error signal $\overline{E}_n$ to line 30 that applies the signal to the absolute value network 32 of logic circuit 13 to derive an absolute value signal $|\overline{E}_n|$. The absolute value signal $|\overline{E}_n|$ is applied to a summing network 34 in opposition to the minimum reference signal $\overline{E}_{min}$. If the absolute value signal $|\overline{E}_n|$ satisfies the criterion $|\overline{E}_n| > \overline{E}_{min}$, the output of the summing means 34 or the validated signal qualifies AND gate 35 to pass a compute pulse CP to NAND gate 85 of the counter 18 via line 31 in response to the compute control pulse CCP applied to the logic circuit 13 by line 43. Flip flops FF1, FF2 and/or FF3 will change their 0 and/or 1 states to adjust the blocking and/or transmitting states of gates G4, G5, and/or G6, respectively, in response to the compute pulse CP and according to the directional control signal from network 17, as previously described, if NAND gate 85 does not block the compute pulse CP applied by line 31. According to the blocking and/or transmitting states of gates G4, G5, and/or G6, the attenuating network 16 provides system gain $K_d$.

At 96 milliseconds programmer 14 rescinds compute control pulse CCP, maintains the memory control pulse MCP and provides a sample and transfer pulse STP that is applied to gates G1 and G3 by line 42. The predicted future error signal $\overline{E}_{n+1}$ applied to the sampler-and-hold circuit 12 is transmitted by gate G1 to the memory device or capacitor M and to the amplifier 52. With gate G2 transmitting in response to pulse MCP, capacitor M samples or is charged to the value of the error signal $\overline{E}_{n+1}$, while amplifier 52 provides the error signal $\overline{E}_{n+1}$ to line 60 of attenuator network 16 to be modified by system gain $K_d$. The modified signal $K_d\overline{E}_{n+1}$ is applied across the potentiometer 54 to be modified by $\rho$ and is applied to gate G3. With gate G3 transmitting in response to pulse STP, a command increment $(\Delta X)_n$ equal to the signal $\rho K_d \overline{E}_{n+1}$ is provided. At 100 milliseconds programmer 14 rescinds the control pulses MCP and STP, and the self-adaptive controller 10 returns to a quiescent state.

Where a self-adaptive control system includes control channels in addition to the single channel of FIGURE 1, each of the channels requires a model 8, a predictor 9, and a controller 10 to provide associated error signals $E_n$ and $\overline{E}_{n+1}$ for each channel. However, portions of the controllers 10 may be common by the use of mutiplexing or programmed time sharing. A controller arrangement of this type is shown in FIGURE 5 in which there are three controllers 110, 210, and 310, each corresponding to controller 10 of FIGURES 1, 2 and 3 with each of the logic networks 13, programmers 14, and direction control networks 17 removed. Each of the controllers 110, 210 and 310 and their included parts are identified by three digit numbers corresponding to the two digit identifying numbers of the controller 10 and its included parts, wherein the hundred digit merely identifies the channel. Corresponding signals and pulses are identified by letters, or by letter and number combinations corresponding to those associated with controller 10 of FIGURES 1, 2, and 3, and are identified as to channel by a prefix number 1, 2, or 3.

Referring now to FIGURES 5 and 6, three self-adaptive controllers 110, 210 and 310 have input lines 120, 220 and 320, respectively, for receiving and modifying respective predicted future error signals $1(\overline{E}_{n+1})$, $2(\overline{E}_{n+1})$, and $3(\overline{E}_{n+1})$ from corresponding predictors 9 (not shown) by associated system or channels gains to provide corresponding command increment signals $1(\Delta X)_n$, $2(\Delta X)_n$, and $3(\Delta X)_n$. The predictors 9 also provide actual present error signals $1(E_n)$, $2(E_n)$, and $3(E_n)$ to input lines 150, 250, and 350, respectively. Lines 150, 250 and 350 are connected by gates 1G7, 2G7, and 3G7, respectively, to a common input line 451. Line 451 applies a signal $1(E_n)$, $2(E_n)$, or $3(E_n)$ to the directional control network 17 when a corresponding gate 1G7, 2G7, or 3G7 transmits in response to a compute criterion pulse 1CCP, 2CCP, or 3CCP provided by a programmer 414.

Programmer 414 is a modification of programmer 14 and provides three timed pulse series each including a memory control pulse MCP, a compute control pulse CCP, and a sample and transfer pulse STP as shown on the chart of FIGURE 6. Each series of pulses provides a compute interval CI and a sample and transfer interval STI for the corresponding controller 110, 210, or 310. Although not shown, programmer 414 is connected to gates 1G1, 1G2, and 1G3 of controller 110; to gates 2G1, 2G2, and 2G3 of controller 210; and to gates 3G1, 3G2, and 3G3 of controller 310 in the same manner as the controller 14 is connected to gates G1, G2 and G3 of controller 10 of FIGURE 3. Programmer 414 also has output lines 143, 243, and 343 connected to gates 1G7, 2G7, and 3G7, respectively, and to AND gates 135, 235, 335, respectively of logic circuit 413.

Amplifiers 152, 252, and 352 have respective output lines 153, 253, and 353 for providing one of the predicted present error signals $1(\overline{E}_n)$, $2(\overline{E}_n)$, and $3(\overline{E}_n)$, respectively, to the amplifier 452 depending upon which of the controllers 110, 210, or 310 is operating in its compute interval 1CI, 2CI, or 3CI, respectively. A line 453 connects the output of amplifier 452 to the direction control network 17 that is common to all of the controllers 110, 210, and 310 and provides a direction control signal via its output line 77a to all the counters 118, 218, and 318.

Logic network 413 is a modified form of the logic network 13 of FIGURE 3 and has an input line 430 connecting amplifier 452 to an absolute value network 32. The absolute value network 32 provides an absolute value signal $|1(\overline{E}_n)|$, $|2(\overline{E}_n)|$, or $|3(\overline{E}_n)|$ depending upon which of the predicted error signals is applied by line 430 to the logic network 413. The absolute value signal provided by network 32 is applied to a summing means 34 in opposition to the minimum reference signal $\overline{E}_{min}$ provided by a source 33 to satisfy the criterion $$|1(\overline{E}_n)| > \overline{E}_{min}, \quad |2(\overline{E}_n)| > \overline{E}_{min},$$

or $|3(\overline{E}_n)| > \overline{E}_{min}$ depending upon the interval of the operating sequence. The summing means 34 is connected to AND gates 135, 235, and 335 that have respective output lines 131, 231, 331 connected to counters 118, 218, and 318, respectively.

By referring to FIGURE 6, it can be seen that the controllers 110, 210 and 310 are each in a quiescent state for 92 milliseconds of the 100 millisecond sequence and have a compute interval CI, and a sample and transfer interval STI each of four milliseconds duration. The programmer 414 provides the same sequence cycle for each controller 110, 210, or 310 that programmer 14 provides for controller 10. However, programmer 414 is common to all of the controllers 110, 210 and 310.

Accordingly, the novel device provides a self-adaptive control system having a controller that receives actual present error and predicted future error signals; provides a command increment, during a time sequenced transfer interval, that corresponds to a system gain modified predicted future error signal; and uses the actual and the stored present error signals for incrementally adjusting system gain. The controller is comprised of a sampler-and-hold network, a signal attenuating network, a counter for controlling the attenuating network, logic and direction control networks for providing information to the counter, and a programmer for programming a time sequence. This arrangement is adapted to multiplexing by providing a plurality of controllers in which the logic networks, the direction control networks and the programmers are eliminated from each of the controllers in favor of a logic network, a direction control network and a programmer each common to all the controllers.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A self-adaptive control system using sampled data at discrete intervals to provide command increment signals to control a device, comprising means for providing signals representing rate of response of the device to the command increment signals, means for providing a command signal means responsive to said command signal for providing a signal representing desired response, circuit means responsive to said signal representing desired response circuit means responsive to said signal representing desired response and to said signal representing rate of response for providing signals representing actual present error and predicted error at a predetermined future instant, programmed controller means responsive to said predicted error signal for providing command increment signals at discrete intervals to actuate said device, said controller means including means for modifying said predicted error signal by system gain, means for sampling and storing said predicted error signal, means responsive to said stored predicted error signal for providing a desired predicted error signal representing the desired fraction of the predicted error to be present as actual error after actuation of said said device, and means for incrementally adjusting said system gain at discrete intervals in accordance with the actual present error signal and said desired predicted error signal.

2. A self-adaptive control system using sampled data at discrete intervals to provide command increment signals to control a device comprising a plurality of control channels, means for providing signals representing rate of response of the device to said command increment signals, means for providing a command signal for each of said control channels, each of said channels including means for providing signals representing desired response in accordance with said command signals, circuit means responsive to said signals representing desired response and to said signals representing rate of response for providing signals representing actual present error and predicted error at a predetermined future instant, each of said control channels including programmed controller means responsive to a predicted error signal for providing command increment signals by modifying a predicted error signal by channel gain and transmitting a fraction of said gain modified signal at discrete intervals to actuate said device, each of said controller means having means for storing said predicted error signal and means for incrementally adjusting said channel gain in accordance with said stored predicted error signal and said actual present error signal.

3. A self-adaptive control system using sampled data at discrete intervals to provide command increment signals to control a device, comprising a plurality of control channels, means for each channel for providing a signal representing rate of response of the device to a command increment signal, means for providing a command signal for each of said control channels, each of said control channels comprising means for providing a signal representing desired response in accordance with the command signal for said channel, circuit means responsive to said signals representing desired response and to said signals representing rate of response for each channel for providing signals for each channel representing actual present error and predicted error at a predetermined future instant, each of said control channels including programmed controller means responsive to a predicted error signal for providing command increment signals by modifying the predicted error signal by channel gain and transmitting a fraction of said gain modified signal at discrete intervals to actuate said device, the controller having means for storing the predicted error signal, means for incrementally adjusting channel gain at discrete intervals according to the relative errors represented by said stored predicted error signal, an actual present error signal, and means common to the controllers of all the control channels and arranged to sequentially program each controller to sequence the operation of the control system.

4. A controller having a repetitive operating sequence for providing command increment signals to control a device, means for providing a signal representing an actual error between an actual and a desired response of said device to a command increment signal, means for providing a predicted error signal provided representing the actual error predicted to occur at the next sequence, programming means arranged to repeatedly provide the control pulses to sequence the controller operation, a gated network for transmitting said predicted error signal in response to a control pulse during each sequence, the gated network having means for sampling the predicted error signal during transmission and for storing the sampled predicted error signal until sampling during the next sequence, computer means for modifying the transmitted predicted future error signal by system gain, means for transmitting a fraction of said gain modified predicted error signal to provide a command increment signal to actuate said device during each sequence, means responsive to said stored predicted future error signal for providing a desired predicted error signal representing the desired fraction of the predicted error to be present as actual error after actuation of said device, means for incrementally adjusting system gain according to said relative errors represented by the actual error signal and said desired predicted error signal.

5. A controller having a repetitive operating sequence for providing command increment signals to control a device, comprising a plurality of control channels, means for providing signals each representing an actual present error between an actual and a desired response to a command increment signal, means for providing predicted error signals each representing the error predicted to occur at the next sequence, programming means arranged to repeatedly provide control pulses for sequencing the controller operation, gated means for transmitting each of said predicted error signals in response to control pulses during each sequence, said gated means having means for sampling the predicted error signals during transmission and for storing the sampled predicted error signals until sampling during the next sequence, computer means each of said control channels each for modifying a transmitted predicted error signal by channel gain, means for transmitting a fraction of each of said gain modified predicted error signals to provide command increment signals to actuate said device, means responsive to said stored predicted error signal for providing desired predicted error signals representing the desired fractions of the predicted errors to be present as actual errors after actuation of said device, and having means for incrementally adjusting channel gain for each of said computer means during each sequence according to said desired predicted error signal and said actual present error signal.

6. The controller according to claim 5 in which each computer means includes means for providing a direction control signal according to the relative errors represented by said desired predicted error signal and said actual present error signal, and a logic circuit responsive to said sampled predicted error signal for validating said desired predicted error signal to provide a control signal and having a gated output qualified by the control signal to transmit a compute pulse in response to a control pulse during each sequence.

7. The controller according to claim 6 in which the direction control signal providing network and the logic network of one of the computer means is common to and time shared by all of the channels.

8. A self-adaptive control system for controlling a device comprising means for providing a signal representing the desired response of the device, means for providing a signal representing the actual response of the device, means for providing a predicted error signal representing the difference between the desired and actual response signals predicted to occur at a predetermined future instant, controller means for modifying said predicted error signal by a computed system gain, said controller means including means for transmitting a fraction of said gain modified predicted error signal to provide a command increment signal to actuate said device, means for providing an actual error signal representing the difference between the desired and actual response signals at a present instant, and gain adjustment means responsive to said error signals providing an incremental change of predetermined magnitude in system gain.

9. A self-adaptive control system for controlling a device comprising means for providing a signal representing the desired response of the device, means for providing a signal representing the actual response of the device, means responsive to said desired response signal and said actual response signal for providing an actual present error signal and a predicted future error signal, means for sampling said predicted error signal, means including variable gain means responsive to said predicted error signal for providing a discrete command signal to actuate said device, further means responsive to said sampled error signal for providing a desired predicted error signal representing the desired fraction of the predicted error to be present as actual error after actuation of said device, and gain adjustment means for incrementally adjusting the gain of said variable gain means in accordance with said desired predicted error signal and said actual error signal to compensate for a change in the responsiveness of said device.

10. Apparatus as defined by claim 9, said gain adjustment means including logic means responsive to said sampled predicted error signal for preventing a gain adjustment based on said erroneous data.

References Cited by the Examiner

UNITED STATES PATENTS 2,712,414 7/1955 Ziebolz _____ 235—151
2,972,447 2/1961 White.

JOHN F. COUCH, *Primary Examiner.*

CHESTER L. JUSTUS, *Examiner.*

UNITED STATES PATENT OFFICE
CERTIFICATE OF CORRECTION

Patent No. 3,221,238            November 30, 1965

Arnold Unger et al.

It is hereby certified that error appears in the above numbered patent requiring correction and that the said Letters Patent should read as corrected below.

Column 9, lines 74 and 75, strike out "circuit means responsive to said signal representing desired response"; column 10, lines 50 and 51, strike out "for each", each occurrence; line 51, strike out "channel", first occurrence.

Signed and sealed this 10th day of January 1967.

(SEAL)
Attest:

ERNEST W. SWIDER
Attesting Officer

EDWARD J. BRENNER
Commissioner of Patents